United States Patent
Hashem et al.

(10) Patent No.: US 6,748,222 B1
(45) Date of Patent: Jun. 8, 2004

(54) METHOD AND SYSTEM FOR PROVIDING LOAD-BALANCED COMMUNICATION

(75) Inventors: Bassam M. Hashem, Nepean (CA); Shalini S. Periyalwar, Ottawa (CA); Anatoli Kotov, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 481 days.

(21) Appl. No.: 09/706,995

(22) Filed: Nov. 6, 2000

(51) Int. Cl.[7] ................................................. H04Q 7/20
(52) U.S. Cl. ........................ 455/453; 455/525; 455/522
(58) Field of Search ................................. 455/436, 449, 455/525, 437, 442, 417, 452.2, 512, 517, 566, 443, 434, 450, 453, 522, 69; 375/260; 370/331, 332, 329, 330, 335, 342, 441

(56) References Cited

U.S. PATENT DOCUMENTS

| | | | |
|---|---|---|---|
| 6,216,004 B1 * | 4/2001 | Tiedemann et al. | 455/442 |
| 6,327,472 B1 * | 12/2001 | Westroos et al. | 455/450 |
| 6,415,153 B1 * | 7/2002 | Liew | 455/453 |
| 6,564,068 B1 * | 5/2003 | Marsan | 455/525 |
| 6,609,007 B1 * | 8/2003 | Eibling et al. | 455/522 |

OTHER PUBLICATIONS

Jean–Paul Linnartz and Shinsuke Hara, "*Special Issue on Multi–Carrier Modulation*," 7 pages, 1995.
"*Exploring OFDM*," from Wireless Data Communications website, http://www.wi-lan.com, 3 pages, downloaded Sep. 18, 2000.
"*Multi Carrier CDMA*," from the University of California at Berkeley website, http://diva.eecs.berkeley.edu, 4 pages, downloaded Sep. 18, 2000.
RWTH website, http://www.ert.rwth–aachen.deProjekte, 14 pages, downloaded Sep. 18, 2000.
Ove Edfors et al., "*An introduction to orthogonal frequency–division multiplexing*," Sep. 1996, 54 pages.

* cited by examiner

*Primary Examiner*—Charles Appiah
*Assistant Examiner*—Rafael Perez-Gutierrez
(74) *Attorney, Agent, or Firm*—Christopher & Weisberg P.A.

(57) ABSTRACT

A method and system for selecting a station, in a communication system having a plurality of stations, for communication with a device based on station load conditions is provided. A plurality of base stations determine their station load condition. Station transmit power level is adjusted for at least a part of a transmitted signal in each of the plurality of stations in accordance with the respective determined station load condition. A device receives the transmitted signal from at least one of the plurality of stations and selects a station for communication. The station selection is made by the device based at least in part on a received power level of the adjusted portion of the transmitted signal.

35 Claims, 4 Drawing Sheets

METHOD AND SYSTEM FOR PROVIDING LOAD-BALANCED COMMUNICATION

FIELD OF THE INVENTION

The present invention relates to a method and system for balancing traffic load between devices and base stations, and in particular, to a method and system for balancing traffic load such that communication traffic is well distributed among base stations by allowing base stations to represent a station load condition to devices for prospective data communication a manner which does not adversely impact base station performance.

BACKGROUND OF THE INVENTION

The success of wireless communications has increased demand for new types of wireless devices as well as for an increasing quantity of these devices. However, as success has grown, so has the burden placed on the communication infrastructures which support the wireless devices. The communication infrastructure includes base stations, used to communicate with the wireless devices, arranged in a network with access being provided to external services, for example, Internet access. The infrastructure exists in the form of increasing base station and antenna densities, as well as the increasing processing loads placed on base station communication equipment. This is particularly the case because the wireless devices are mobile, thus requiring that communication be handed off from one base station to another.

During movement requiring a switch in communication from one base station to another, the handoff protocols, such as "soft handoff" protocols in a code division multiple access environment, typically place an extra processing load on the base station. In addition, a base station executing at processing capacity may not be able to accommodate additional wireless devices.

It is desired, therefore, to have a system which allows communication between a wireless device and a base station to be handed to another base station which can accommodate the additional processing and spectrum load posed by the wireless device.

Figure 1:
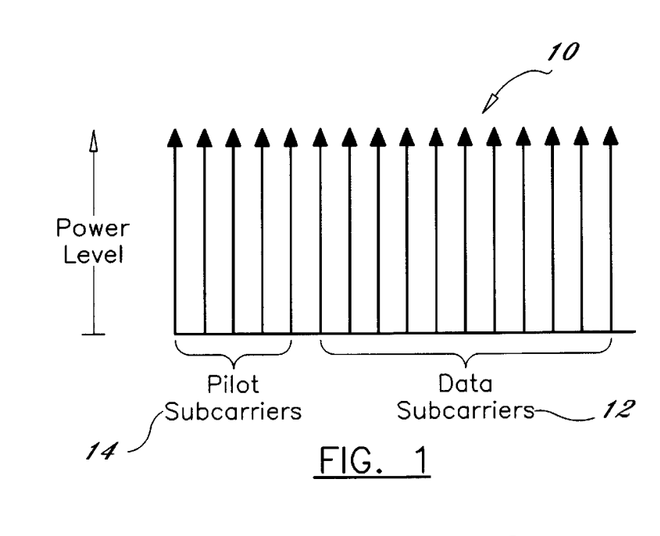
FIG. 1 is a diagram of power distribution among subcarriers in a known communication arrangement.

In orthogonal frequency division multiplexing (OFDM), an OFDM symbol is comprised of many subcarriers. These subcarriers carry both control and data information. Typically, a dedicated set of subcarriers is used as pilots and are transmitted by the base station with maximal power. Referring to FIG. 1, a group of subcarriers 10 is shown in which data subcarriers 12 are transmitted at the same power level as pilot subcarriers 14.

Of course, based on factors such as the distance from the wireless devices to the base station, multipath fading and shadowing, the received power at the wireless devices will vary from one another. Because a communication channel can be frequency selective, i.e., have different fading rates among subcarriers, the received power at a particular device will also vary between the received subcarriers. Given these variations, the communication data rate which can be supported between the wireless device and the base station is proportional to the carrier-to-interference (C/I) ratio as measured by the wireless device.

Typically, wireless terminals are arranged to initiate communication with, or handoff to, the base station having the greatest C/I ratio. This arrangement is known as site selection diversity transmission (SSDT). Current methods of SSDT, for example those proposed and included in wireless communication standards such as the $3^{rd}$ Generation Partnership Project (3GPP) standard and the High Data Rate (HDR) proposed standard, take into account the received signal strength; but as discussed above, the methods fail to identify or take into account the processing and wireless device quantity loads (hereinafter together referred to as "load") of the base stations. These arrangements therefore do nothing to balance the communication load among base stations. As such, even though a wireless device might be receiving the best signal from a particular base station, that base station might be too loaded to service the added wireless device. The result is a dropped call or a communication session perceived by the user of the wireless device as poor.

Further, arrangements in which the base station must proactively reject communication with a wireless device waste base station processing resources, further loading a potentially overloaded base station. In other words, systems which rely on the base station to make the decision as to whether to accept or reject a communication request made by a wireless device disadvantageously worsen the loading problem. Also, this arrangement adds unnecessary communication delay because the wireless terminal must wait to receive an indication as to whether the communication request is accepted or rejected.

It is therefore desirable to have a system and method which links site selection diversity to the load of the base station in a manner which does not adversely effect the coverage area of the base station or the data throughput of the base station, particularly in an OFDM environment.

SUMMARY OF THE INVENTION

The present invention provides a method and system for facilitating load-balanced communication between communication devices and base stations, particularly in an OFDM wireless communication environment. The load balancing is achieved without adversely impacting system performance and without reducing the coverage area of each base station. The load balancing is preferably accomplished by minimizing the amount of CPU resources consumed during communication initialization and/or communication handoff from one base station to another.

Further, the present invention advantageously employs a modulation/coding scheme which is arranged to facilitate data communication between a device and a base station in a load-balanced environment in a manner which optimizes channel utilization.

As one aspect of the invention, a method for selecting a station, in a communication system having a plurality of stations, for communication with a device based on a station load condition of the respective stations, is provided in which the station load condition for each of the plurality of stations is determined. The station transmit power level for at least a part of a transmitted signal in each of the plurality of stations is determined in accordance with the respective determined station load condition. The transmitted signal from at least one of the plurality of stations is received. A station for communication is selected. The station selection is made by the device based at least in part on the received power level of the adjusted portion of the transmitted signal.

As still another aspect, the present invention provides a substantially load-balanced communication system having at least one station and at least one communication device. Each station determines its station load condition and adjusts its station transmit power level for at least a part of a transmitted signal in accordance with the respective determined station load condition. The station transmit power level is adjusted to substantially balance the station load conditions among the stations. Each device receives the transmitted signal from the at least one station and selects a station for communication. The station selection is made by the device based at least in part on the received power level of the adjusted portion of the transmitted signal.

According to another aspect, the communicating system is an OFDM system.

As still yet another aspect, the present invention provides a base station for communication with a device, in which the base station has a transmitter transmitting a signal to the device. A central processing unit controls the transmitter by determining a base station load condition and adjusting the station transmit power level for at least a part of the signal. The station transmit power is adjusted in accordance with the determined station load condition.

Each base station is preferably arranged to determine its load based on one or more load factors and manifest that load condition in the form of the above-described reduced carrier power output. The base station takes this adjustment into account when determining the modulation and coding scheme to employ for data communication with a device.

According to another aspect, the present invention provides a device for communication with one or more base stations, in which the device has a receiver receiving a signal from at least one of the base stations. A central processing unit is in operative communication with the receiver and determines a carrier to interference power ratio for each of the received signals and selects a base station for data communication based on the determined carrier to interference power ratios. The carrier to interference ratios are based, at least in part, on a loading condition of the base station transmitting the corresponding signal.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Initially, it is noted that term "data" as used herein refers generally to the content being transported from one location or device to another, regardless of form. For example, "data" as used herein can include voice content as well as non-voice content and can include overhead data such as packetizing information, error checking codes, etc. In the context of wireless communications, data channels, data subcarriers, etc. refer to those subcarriers which carry information other than information found in pilot subcarriers such synchronizing bits, control bits and pilot bits used for channel estimation.

Figure 2:
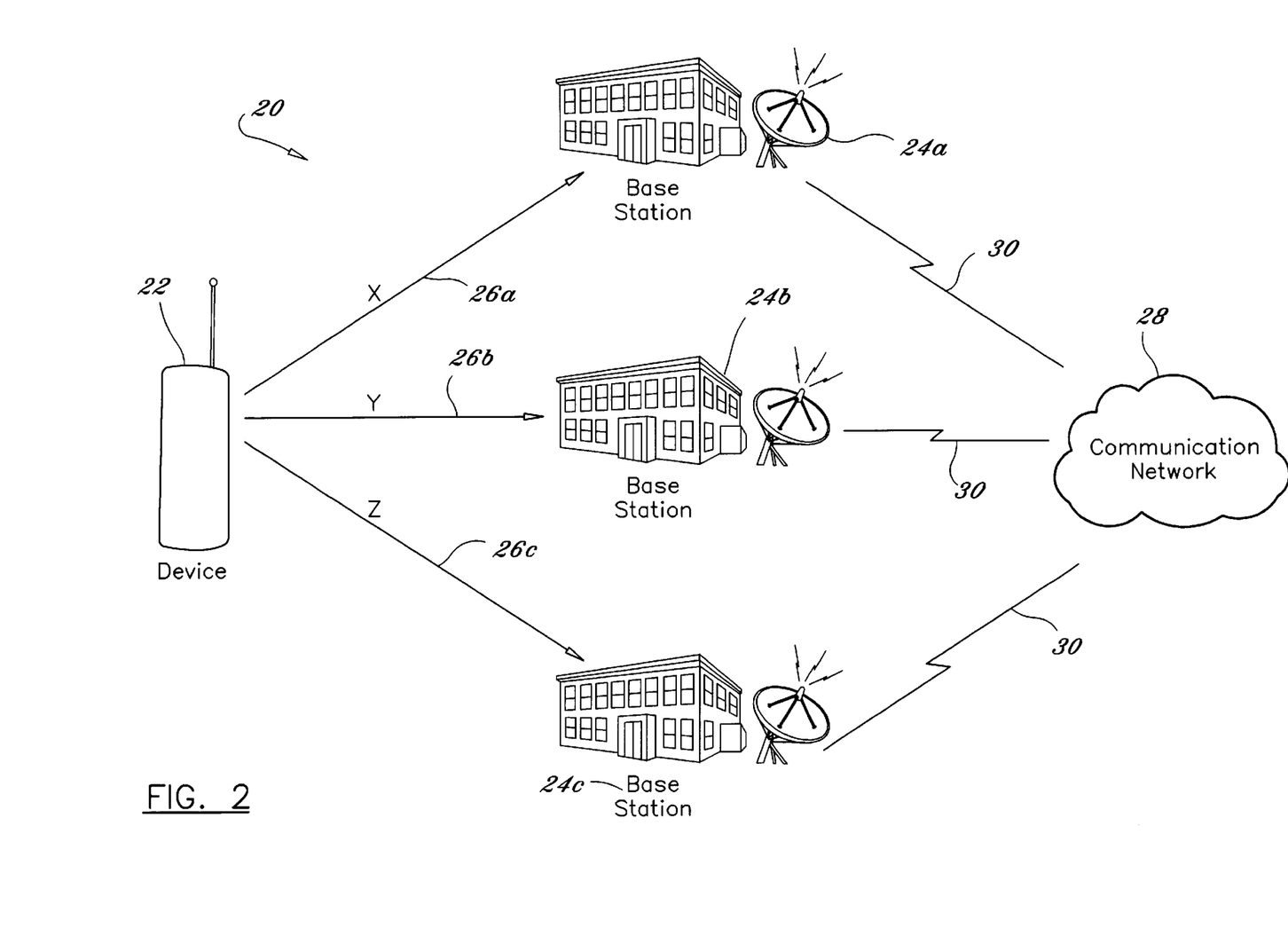
FIG. 2 is a communication system constructed in accordance with the principles of the present invention.

Referring now to the drawing figures in which like reference designators refer to like elements, there is shown in FIG. 2 a communication system constructed in accordance with the principles of the present invention and designated generally as 20. Communication system 20 is preferably comprised of one or more devices 22 in communication with one or more base stations 24a, 24b and 24c via a respective communication channel 26a, 26b and 26c. Base stations 24a, 24b and 24c are generally referred to herein as base station(s) 24. The distance from device 22 to the different base stations 24a, 24b and 24c for communication channels 26a, 26b and 26c are designated as "x", "y" and "z", respectively. For the purposes of discussion herein, x<y<z.

Communication system 20 also includes communication network 28 coupled to base stations 24 via communication links 30. Communication links 30 and communication network 28 can undertake any arrangement used to facilitate communication between base stations 24 themselves and/or external services such as Internet access, news and stock quotation services and the like (not shown). Arrangements for communication network 28 and communication links 30 such as those used to support digital wireless OFDM networks are known.

For example, communication links 30 can be wireless or wired links such as multi-megabit per second links. Communication network 28 is comprised of digital switches, routers and other known digital communication devices.

Device 22 is preferably a wireless communication device such as a digital cellular phone, wireless personal digital assistant (PDA), laptop computer equipped with a facility for wireless communications and the like. Similarly, communication channels 26a, 26b and 26c are preferably wireless communication channels such as those employed in an OFDM system used in a wireless high speed fixed access data system employing a wireless High Speed Data Protocol (HDP) or a wireless Digital Subscriber Line (DSL) signal. Further, it is contemplated that communication channels 26a, 26b and 26c can be arranged to accommodate wireless local area network signals. Standardized protocols for providing a wireless high speed data protocol, a wireless DSL signal and a wireless local area network signal are known. However, it is contemplated that the present invention can be arranged to accommodate any developed wireless data communication protocols.

Although device 22 is preferably a wireless communication device, the present invention is not limited to such. It is contemplated that the present invention can be implemented such that device 22 is coupled to base stations 24 via one or more wired connections, such as an arrangement in which multiple wired digital subscriber line DSL connections between device 22 and multiple base stations 24 are used.

Figure 3:
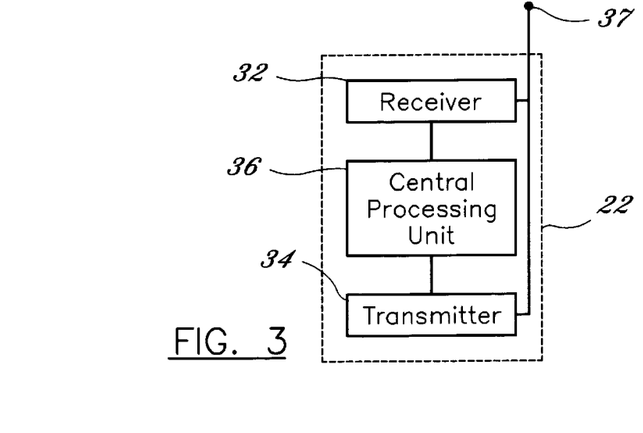
FIG. 3 is a is a block diagram of a communication device constructed in accordance with the principals of the present invention.

FIG. 3 is a block diagram of a device 22 constructed in accordance with the principles of the present invention. As shown in FIG. 3, device 22 is preferably comprised of device receiver 32 and device transmitter 34, each of which is coupled to and controlled by device central processing unit 36. Device receiver 32 and device transmitter 34 are coupled to antenna 38 for respectively receiving and transmitting signals from and to base station 24. In the case where device 22 is a wired device, antenna 38 is replaced by a suitable network interface hardware arrangement.

Receiver 32 is preferably arranged to receive OFDM signals transmitted by base stations 24. Device transmitter 34 is likewise preferably arranged to transmit OFDM signals to base stations 24 via antenna 37. Device central processing unit 36 is any central processing unit capable of executing the device functions described in detail below.

In accordance with the present invention, device central processing unit 36 is preferably arranged to include or have access to sufficient memory (not shown) required to store data, buffer transmit and receive data and programmatic code to perform its designated, below-described functions. Further, device central processing unit 36 is preferably arranged to determine a carrier level to interference level power ratio for each of the signals received from a respective base station, for example the signals received via communication channels 26a, 26b and 26c respectively. Methods for calculating the carrier to interference level power ratio, commonly referred to as the "C/I ratio" or "C/I power level ratio," once a power level of the carrier and a power level of the interference level are determined, are known. Further, certain wireless communication standards such as the 3GPP Standard set forth particular C/I ratios for acceptable communication rates and quality.

In a multi-channel communication environment such as an OFDM environment, certain subcarriers (or sub-channels) are dedicated to pilot signaling and the remaining subcarriers (sub-channels) dedicated to the transmission of data content. The arrangement of devices in which the pilot signals are used to determine the received carrier power level are known.

The interference power level is a measure of channel interference including Gaussian noise, the result of multi-path fading, transmissions from other devices and noise resulting from movement of the device 22. In accordance with the present invention, device central processing unit 36 measures the received interference power level by measuring this level in one or more pilot subcarriers and/or one or more data subcarriers. This arrangement advantageously allows for the determination of the received interference power level across one or more different types of subcarriers, even in a case where the power level of the pilot subcarriers is intentionally reduced by base station 24 in accordance with the present invention, as discussed below in detail.

In addition, receiver central processing unit 36 reports the determined C/I power level ratio to the selected base station 24 as part of the request from device 22 to base station 24 to initiate data communication. Preferably, the determination of the base station 24 to which device 22 request communication is the base station 24 from which the signal received by device 22 has the greatest C/I power level ratio. It must be kept in mind, however, that, as discussed below in detail, the C/I power level ratio for each base station 24 is not based solely on the distance from device 22 to base station 24. Rather, the C/I power level ratio is also substantially based on the load condition of each base station 24, as discussed in detail below.

Figure 4:
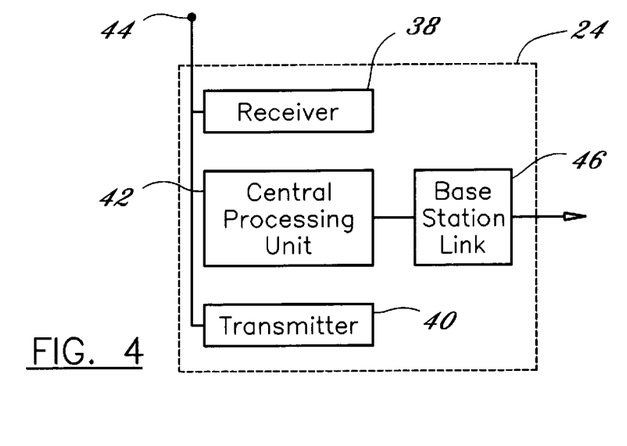
FIG. 4 is a is a block diagram of a base station constructed in accordance with the principals of the present invention.

FIG. 4 is a block diagram of a base station 24 constructed in accordance with the principles of the present invention. As shown in FIG. 4, base station 24 is preferably comprised of base station receiver 38 and base station transmitter 40, each of which are coupled to and controlled by base station central processing unit 42. Base station 24 is also preferably comprised of base station antenna 44 which is coupled to base station receiver 38 and base station transmitter 40 for receiving signals transmitted by device 22 and transmitting signals to device 22, respectively.

Base station 24 preferably also includes base station link 46 which provides the necessary interface hardware and/or software to couple base station 24 to communication network 28 via communication link 30. This interface hardware takes the form of plugs, jacks, and electronic circuit elements. The interface software, when executed, provides the drivers and other functions necessary to receive data from communication network 28 and transmit data to communication network 28.

Base station receiver 38 is preferably arranged to receive wireless OFDM signals from a plurality of devices 22. Similarly, base station transmitter 40 is preferably arranged to generate and transmit OFDM signals to a plurality of devices 22. Of course, it is contemplated that other methods of wireless and wired communication can be supported.

Base station central processing unit 42 preferably includes or has access to a storage unit which contains the programmatic instructions needed to perform the below-described functions. Further, the storage unit is preferably arranged to store data corresponding to in-progress communication with devices 22, provide buffering of data transmitted and/or received to/from devices 22 and communication network 28, and the like. In general, any central processing unit which provides the described functions of base station 24 can be used.

In the case of both device 22 and base station 24, each of the above-described components of the respective hardware components are arranged with an internal bus communication structure which facilitates communication among the respective elements. Further, it is contemplated that any combination of the elements of each respective device 22 and base station 24, such as the receivers, transmitters and central processing units, can be provided as a single semiconductor integrated circuit.

In accordance with the present invention, each base station 24 is equipped with the ability to determine a station load condition thereon. The station load condition is a measure of the quantity of resources consumed by base station 24 based on one or more factors. These factors include, but are not limited to, the processor usage (utilization) of the base station central processing unit 42, the bandwidth utilization of the base station communication link 30, the quantity of devices 22 engaged in communication with the base station and the aggregate communication data rate from and/or to all devices 24 engaged in communication with the particular base station.

It is contemplated that each of these elements can be weighted based on the particular performance objectives for base station 24 and system 20. For example, if the design objective is to measure load based primarily on the utilization of base station central processing unit 42, that load condition factor can be weighted more heavily than other factors such as the base station communication link utilization.

Figure 5:
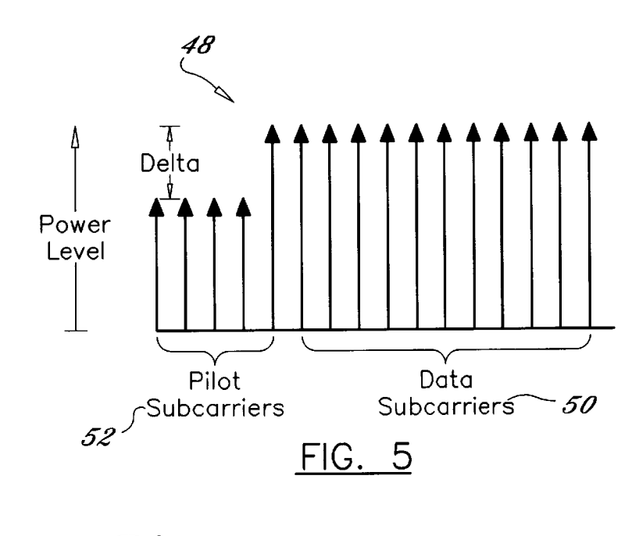
FIG. 5 is a diagram of power distribution among subcarriers.

The load condition is used by each base station 24 to determine an amount by which to reduce the power level of certain transmitted subcarriers, for example one or more pilot subcarriers in an OFDM communication system. This arrangement is depicted in FIG. 5 which shows a group of subcarriers 48 as implemented in accordance with the present invention. Subcarriers 48 are comprised of data subcarriers 50 which transport data content and pilot subcarriers 52 which carry, among other things, synchronizing data. As shown in FIG. 5, the power level of pilot subcarriers 52 has been reduced an amount "delta" from the transmitted power level of data subcarriers 50. The reduction in transmitted power of pilot subcarriers 52 is based on the base station load condition.

Although FIG. 5 shows the pilot subcarriers arranged at the beginning of the carrier, i.e. OFDM symbol, the present invention is not limited to such. It is contemplated that pilot subcarriers can be distributed throughout the OFDM symbol. Further, although FIG. 5 shows the pilot subcarriers as each having the same transmit power level, it is contemplated that the pilot subcarriers can be arranged to have different power levels such that only a subset of the pilot subcarriers are used to determine the received carrier and/or interference power levels.

It is contemplated that the pilot subcarrier transmission power level reduction delta can be linearly or non-linearly related to the base station load condition as necessitated by particular design considerations. This is the case as long as delta remains less than a value required to communicate with devices 22 in a manner in which facilitates continued operation of system 20 and allows base station 24 to remain in compliance with any communication standards for the network in which base station 24 is implemented.

Because the power level of the pilot subcarriers is reduced in relation to the station load condition, the present invention advantageously provides an environment in which the distance between device 22 and base station 24 is not the only significant factor considered by device 22 when determining which base station 24 to communicate with. This is the case because each respective base station 24 reduces the carrier power level of one or more subcarriers based on its load condition. As such, the base station 24 which is closest to device 22 may not be the preferred base station for communication as determined by device 22. This example is explained with reference to FIG. 2.

Recall from above, that distance x<y<z. As such, device 22 is closest to base station 24a and farthest from base station 24c. Under previously known systems, device 22 would request communication with base station 24a because device 22 is closest to base station 24a absent some other factor which raised the interference level, thereby decreasing the C/I ratio to render base station 24b or base station 24c the most desirable base station for communication based on the next highest C/I ratio.

In accordance with the present invention, base station 24a may lower the power transmission level of the pilot sub-channels to such an extent that the C/I ratio based on the received signal from base station 24b or 24c represents the greatest ratio, and therefore the most preferred base station for communication with device 22. The resultant effect of the present invention is to balance the load among base stations.

For example, as the load on base station 24a increases, base station 24b may be the most attractive base station to device 22 by virtue of it having the highest C/I power level ratio. This trend may continue until base station 24b becomes so loaded that it has reduced the pilot subcarrier power level to a point which makes base station 24c or base station 24a preferable for communication with device 22 by virtue of base station 24c or base station 24a having a greater C/I power level ratio than base station 24b. In this matter, the present invention links the site selection diversity to the load of the base station without reducing the coverage area of the base station or the throughput of the base station.

The present invention advantageously does not adversely impact base station central processing unit 42 because base station central processing unit 42 will not even receive a request for communication with device 22 if it cannot accommodate that device. This is the case because the pilot sub-channel transmit power level has been reduced to make the overloaded base station 24 appear less desirable for communication than another base station 24.

Of course, cases in which device 22 is so close to base station 24 as to be out of range of other base stations or receives such a high pilot subcarrier power level as to make the overloaded base station remain the most attractive base station for communication can occur. In this limited case, the overloaded base station 24 will consume a minimal amount of CPU resources to inform device 22 that it is overloaded and cannot accommodate the communication connection request. However, careful consideration of the maximum transmit power levels and the load condition to pilot subcarrier power reduction relationship serve to reduce any adverse impact and maximize the base station coverage area.

Figure 6:
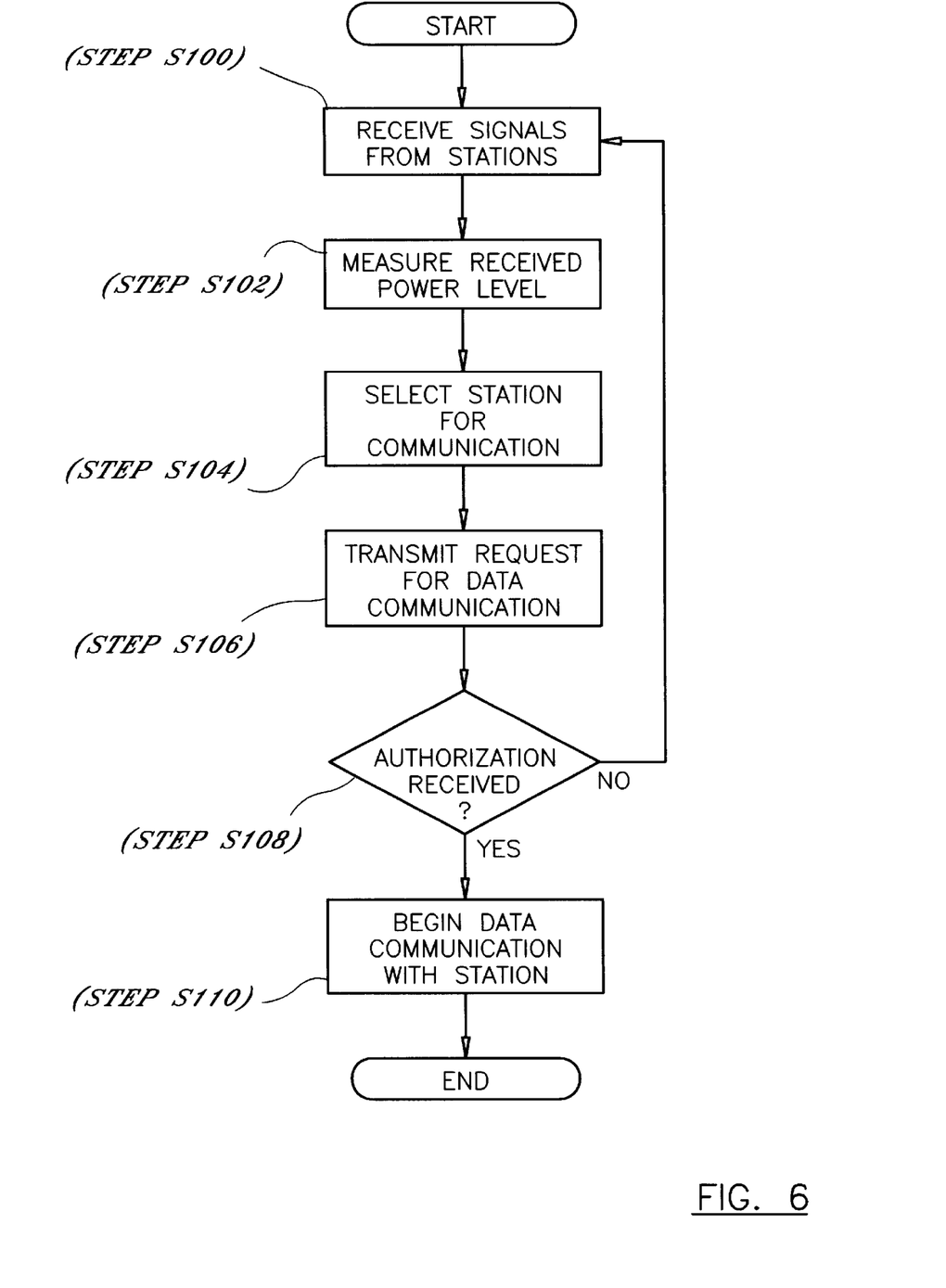
FIG. 6 is a flow chart of the overall operation of the communication device of FIG.3.

The overall operation of device 22 is explained with reference to the flow chart shown in FIG. 6. During the course of operation, device 22 receives signals from stations (step S100). As discussed above, the signals are preferably wireless communication signals such as an OFDM signal having a plurality of subcarriers, each of which represents an encoded portion of transmitted data and/or pilot subcarriers.

Device 22 measures the received power levels for the carrier and the interference using one of the above-described techniques (step S102) and selects a base station for communication (step S104). The selected station is preferably the station having the greatest C/I power level ratio. Examples of steps S102 and S104 occur during communication handoff, such as soft handoff in an OFDM environment, from one base station to another, during communication initialization, i.e., call origination or prior to the transmission of one or more packets. In the latter case, device 22 selects a base station for communication for each packet or for a group of packets. This arrangement is used to efficiently increase data throughput and reduce transmission error.

Device 22 transmits a signal to the selected base station which includes a request to engage in data communication (step S106). The request also preferably includes data indicating the measured C/I ratio of the received signal which forms the basis of the selection.

If authorization to engage in communication with the base station is not received from the selected base station (step S108), device 22 preferably selects another base station, either by re-measuring received signals, or selecting the next best base station based on the next best C/I power level ratio. If authorization is received from the selected base station (step S108), device 22 begins data communication with the selected base station (step S110) using the signal coding and modulation scheme determined by the selected base station 24.

Figure 7:
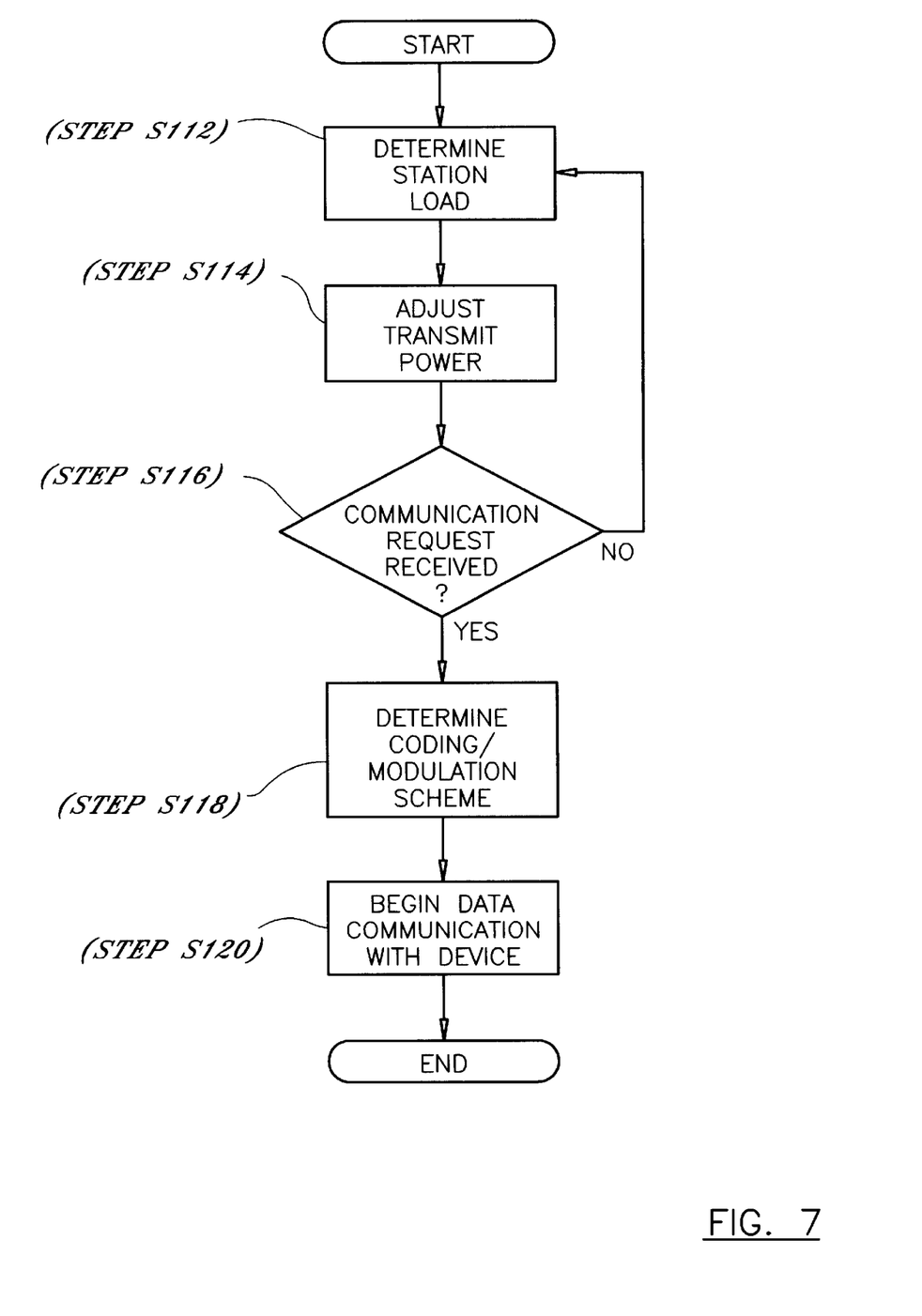
FIG. 7 is a flow chart of the overall operation of the base station of FIG. 4.

The overall operation of a base station 24 constructed in accordance with the principles of the present invention is explained with reference to FIG. 7. During the course of operation, base station 24 determines its station load condition (step S112). The transmit power level of one or more subcarriers such as pilot subcarriers in an OFDM environment is adjusted based on the determined station load condition (step S114).

Upon receipt of a communication request from a device 22 (step S116), and assuming base station 24 is able to accommodate the communication request, base station 24 determines the signal coding and modulation scheme to be used for data communication with device 22 (step S118). Coding and modulation schemes are typically based on the required C/I ratio required to achieve a given transmission bit error rate for a desired type of communication channel.

TABLE 1

| | | Required C/I (dB) to achieve a BER of $2 \times 10^{-4}$ | | |
|---|---|---|---|---|
| Modulation | Coding | Gaussian Channel | Ricean Channel | Rayleigh Channel |
| QPSK | 1/2 | 3.1 | 3.6 | 5.4 |
| QPSK | 2/3 | 4.9 | 5.7 | 8.4 |
| QPSK | 3/4 | 5.9 | 6.6 | 10.7 |
| 16-QAM | 1/2 | 8.8 | 9.6 | 11.2 |
| 16-QAM | 2/3 | 11.1 | 11.6 | 14.2 |
| 16-QAM | 3/4 | 12.5 | 13.0 | 16.7 |
| 64-QAM | 2/3 | 16.5 | 17.1 | 19.3 |
| 64-QAM | 3/4 | 18.0 | 18.6 | 21.7 |
| 64-QAM | 7/8 | 20.1 | 21.0 | 27.9 |

Table 1 shows an example of coding/modulation scheme arrangements for a Gaussian Channel, Ricean Chanel and Rayleigh Channel at a given determined C/I ratio. Modulation types shown include quadrature phase shift key (QPSK) modulation and various types of quadrature amplitude modulation (QAM) arrangements with coding ranging from ½ (50% data component) to ⅞ (87.5% data component) coding. Of course, other channel types, modulation and coding arrangements can be used as can different bit error rate requirements.

It should be noted that base station 24 must take into account that the C/I power level ratio measurement data received from device 22 may be artificially low because base station 24 may have lowered the carrier transmit power level based on its station load condition. As such, base station central processing unit 42 must determine the signal coding and modulation scheme for communication based at least in part from the reported C/I power level ratio measurement and the adjusted station transmit power level. Of course, the adjusted amount of the station transmit power level preferably corresponds to the difference between the pilot signal transmit power level and the transmit power level of the data signal (subcarriers).

For example, if the delta amount of power level reduction in the pilot subcarriers is 0.5 dB, base station 24 must add the delta back into the C/I power level ratio reported by device 22 to obtain an accurate indication of the quality of the communication channel for modulation/coding scheme determination.

Once the coding and modulation scheme has been determined, that scheme is used and/or reported to device 22 and data communication with device 22 commenced therewith (step S120).

As such, the present invention advantageously uses a modulation/coding scheme adapted to facilitate data communication between a device and a base station in a load-balanced environment. The load balancing is accomplished without unduly burdening base station 24 by minimizing the amount of CPU resources consumed during communication initialization and/or communication hand-off from one base station to another.

Further, the present invention advantageously provides a base station arranged to determine its load based on one or more load factors and manifest that load condition in the form of a reduced carrier power output. The base station takes this adjustment into account when determining the modulation and coding scheme to employ for data communication with a device.

The present invention also provides a device which measures the received carrier to interference ratio of an adjusted transmitted signal and selects a base station based on received adjusted signals.

As such, a system-wide load balancing effect is achieved without degrading system performance and without reducing the coverage area of the base station. Coverage area is maintained in the present invention because the transmit power level of the data subcarriers is not impacted and because device transmit power level schemes such as those which alter device transmit power levels as a function of received signal strength at the base station receiver are preserved.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A substantially load-balanced communication system, comprising:
   at least one station, each station:
   determining the station load condition for each of the plurality of stations; and
   adjusting station transmit power level for at least a part of a transmitted signal in accordance with the respective determined station load condition, the station transmit power level being adjusted to substantially balance the station load conditions among the at least one station; and
   at least one device, each device:
   receiving the transmitted signal from the at least one station; and
   selecting a station for communication, the station selection being made by the device based at least in part on a received power level of the adjusted portion of the transmitted signal
   the selected station:
   receiving a carrier to interference power ratio from the device;
   scaling the received carrier to interference power ratio to take into account the adjusted station transmit power level, and
   determining a signal coding and modulation scheme based on the scaled received
   carrier to interference power ratio.

2. The system according to claim 1, wherein the system is an orthogonal frequency domain multiplexed system.

3. A device for communication with one or more base stations, the device comprising:
   a receiver, the receiver receiving a first signal from at least one of the base stations the first signal including an adjusted power level of at least one subcarrier comprised of a pilot signal, the first signal further including at least one other subcarrier being a data signal transmitted at a power level different than the pilot signal;
   a central processing unit in operative communication with the receiver, the central processing unit:
   determining a carrier to interference power ratio for each of the received first signals, the carrier to interference ratio being based, at least in part, on a loading condition of the base station transmitting the corresponding first signal, the power level of one of the pilot signal and the data signal being adjusted based on the loading condition; and selecting a base station for data communication based on the determined carrier to interference power ratios.

4. The device according to claim 3, further comprising a transmitter in operative communication with the central processing unit wherein the central processing unit causes the transmitter to transmit a second signal comprised of a request to initiate data communication with the selected base station.

5. The device according to claim 4, wherein the second signal further includes data corresponding to the determined carrier to interference power ratio.

6. The device according to claim 3, wherein the carrier to interference power ratio is determined based on a measured carrier power level of the first signal and a measured interference power level of the first signal.

7. The device according to claim 6, wherein the first signal is comprised of at least one pilot subchannel and at least one data subchannel, the interference power level being measured from at least one pilot subchannel and at least one data subchannel.

8. The device according to claim 6, wherein the first signal is comprised of at least one pilot subchannel and at least one data subchannel, the interference power level being measured from the at least one data subchannel.

9. The device according to claim 6, wherein the first signal is comprised of at least one pilot subchannel and at least one data subchannel, the interference power level being measured from the at least one pilot subchannel.

10. The device according to claim 6, wherein the first signal is comprised of at least one pilot subchannel and at least one data subchannel, the carrier power level being measured from the at least one pilot subchannel.

11. The device according to claim 3, wherein the selected station is the station whose carrier to interference power ratio is the greatest.

12. The device according to claim 3, wherein the first signal is an orthogonal frequency division multiplexed signal.

13. The device according to claim 3, wherein the first signal is a wireless high speed fixed access data system signal.

14. The device according to claim 13, wherein the wireless high speed fixed access data system is one of a wireless high speed data protocol and a wireless digital subscriber line signal.

15. The device according to claim 3, wherein the first signal is a wireless local area network signal.

16. A method for selecting a station, in a communication system having a plurality of stations, for communication with a device, based on a station load condition of the respective stations, comprising:

determining the station load condition for each of the plurality of stations;

adjusting station transmit power level for at least a part of a transmitted signal in each of the plurality of stations in accordance with the respective determined station load condition, the part of the transmitted signal for which transmit power is adjusted being at least one subcarrier of the transmitted signal comprised of a pilot signal and at least one other subcarrier being a data signal transmitted at a power level different than the pilot signal;

receiving the transmitted signal from at least one of the plurality of stations; and selecting a station for communication, the station selection being made by the device based at least in part on a received power level of the adjusted portion of the transmitted signal.

17. The method according to claim 16, further including:

receiving a reported C/I ratio from the device; and determining a signal coding and modulation scheme for subsequent data communication, the signal coding and modulation scheme being determined at least in part from the reported C/I ratio, the pilot signal transmit power level and the transmit power level of the data signal.

18. The method according to claim 16, further including:

receiving a reported C/I ratio from the device; and determining a signal coding and modulation scheme for subsequent data communication, the signal coding and modulation scheme being determined at least in part from the reported C/I ratio and the adjusted station transmit power level.

19. The method according to claim 16, further including measuring the power level of the received pilot signal and a power level of signal interference and determining a pilot signal power level to signal interference power level ratio, wherein the selected station is the station whose received pilot signal to signal interference level ratio is the greatest level.

20. The method according to claim 16, further including determining the load condition, the load condition being based on at least one of:

a processor usage of the station; and an aggregate communication rate from all devices engaged in communication with the station.

21. The method according to claim 16, wherein the selected station is the station having the greatest received transmitted signal power level.

22. The method according to claim 16, wherein the transmitted signal is a wireless high speed fixed access data system signal.

23. The method according to claim 22, wherein the wireless high speed fixed access data system signal is one of a wireless high speed data protocol and a wireless digital subscriber line signal.

24. The method according to claim 16, wherein the transmitted signal is an orthogonal frequency division multiplexed signal.

25. The method according to claim 16, wherein the transmitted signal is a wireless local area network signal.

26. A base station for communication with a device, the base station comprising:

a transmitter transmitting a first signal to the device;

a central processing unit, the central processing unit controlling the transmitter by:

determining a base station load condition; and adjusting station transmit power level for at least a part of the first signal for transmission to the device, the station transmit power being adjusted in accordance with the determined station load condition, the part of the transmitted signal for which transmit power is adjusted being at least one subcarrier of the transmitted signal comprised of a pilot signal and at least one other subcarrier being a data signal transmitted at a power level different than the pilot signal.

27. The base station, according to claim 26, wherein the central processing unit further controls the transmitter by:

receiving a reported C/I ratio from the device; and determining a signal coding and modulation scheme for the first signal, the signal coding and modulation scheme being determined at least in part from the reported C/I ratio, the pilot signal transmit power level and the data signal transmit power level.

28. The base station, according to claim 26, wherein the central processing unit further controls the transmitter by:

receiving a reported C/I ratio from the device; and determining a signal coding and modulation scheme for the first signal, the signal coding and modulation scheme being determined at least in part from the reported C/I ratio and the adjusted station transmit power level.

29. The base station according to claim 26 wherein the load condition is based on at least one of:

a processor usage of the base station; and an aggregate communication from all devices engaged in communication with the base station.

30. The base station according to claim 26, further including a receiver receiving a second signal from the wireless device, the second signal including a request to initiate data communication with the station, wherein the central processing unit processes the request to initiate data communication with the device by determining a coding and modulation scheme.

31. The base station according to claim 30, wherein the second signal includes a carrier to interference power ratio and wherein the coding and modulation scheme is determined by:

scaling the received carrier to interference power ratio to take into account the adjusted station transmit power level, and determining the signal coding and modulation scheme based on the scaled received carrier to interference power ratio.

32. The base station, according to claim 26, wherein the first signal is a wireless high speed fixed access data system signal.

33. The base station, according to claim 32, wherein the wireless high speed fixed access data system signal is one of a wireless high speed data protocol and a wireless digital subscriber line signal.

34. The base station, according to claim 26, wherein the first signal is an orthogonal frequency division multiplexed signal.

35. The base station, according to claim 26, wherein the first signal is a wireless local area network signal.

* * * * *